United States Patent [19]

Stehling et al.

[11] Patent Number: 4,602,654

[45] Date of Patent: Jul. 29, 1986

[54] COUPLING FOR FIRE HYDRANT-FIRE HOSE CONNECTION

[75] Inventors: Henry J. Stehling, Bedford; George M. Hughes, Jr., Fort Worth; Grady C. North, Grapevine, all of Tex.

[73] Assignee: Hydra-Shield Manufacturing Co., Irving, Tex.

[21] Appl. No.: 772,489

[22] Filed: Sep. 4, 1985

[51] Int. Cl.⁴ .................. F16K 35/06; F16L 29/00; F16L 37/28

[52] U.S. Cl. .................... 137/296; 137/382; 137/512.1; 137/512.5; 137/515.5; 137/800; 220/85 P; 220/284; 220/293; 220/298; 251/148; 285/74; 285/401

[58] Field of Search ............. 137/296, 512.1, 512.5, 137/515.5, 800, 382, 382.5; 220/284, 285, 286, 85 P, 293, 298, 300, 301; 251/147, 148, 152, 299, 303; 285/73, 74, 360, 361, 376, 396, 401

[56] References Cited

U.S. PATENT DOCUMENTS

| | | | |
|---|---|---|---|
| 1,016,744 | 2/1912 | Haymaker | 285/376 |
| 1,634,569 | 7/1927 | Bray | 220/298 |
| 1,932,348 | 10/1933 | Long | 137/515.5 |
| 2,623,567 | 12/1952 | Vries | 220/298 |
| 2,684,860 | 7/1954 | Rafferty | 285/376 |
| 3,007,488 | 11/1961 | Wheeler, Jr. | 137/512.1 |
| 3,371,817 | 3/1968 | Gasbarra et al. | 220/298 |
| 3,538,946 | 11/1970 | Hilsheimer | 137/515.5 |
| 3,638,907 | 2/1972 | Graham et al. | 251/148 |
| 3,931,891 | 1/1976 | Peppler | 220/298 |
| 4,005,732 | 2/1977 | Buckner | 137/512.1 |
| 4,182,361 | 1/1980 | Oakey | 137/296 |
| 4,402,531 | 9/1983 | Kennedy, Jr. | 285/376 |
| 4,523,778 | 6/1985 | Ebert | 285/73 |
| 4,524,997 | 6/1985 | Ebert | 285/74 |

*Primary Examiner*—G. L. Walton
*Attorney, Agent, or Firm*—Millen & White

[57] ABSTRACT

A coupling for a fire hydrant-fire hose connection includes a first coupling member attached to the fire hydrant and a second coupling member attached to the fire hose wherein both the first and second coupling use a Storz connector. A butterfly valve is mounted within the first coupling to prevent access to the interior of the hydrant and a readily removable cover is placed over the first coupling member to shield the member when the hydrant is not in use.

1 Claim, 7 Drawing Figures

U.S. Patent   Jul. 29, 1986   Sheet 1 of 2   4,602,654
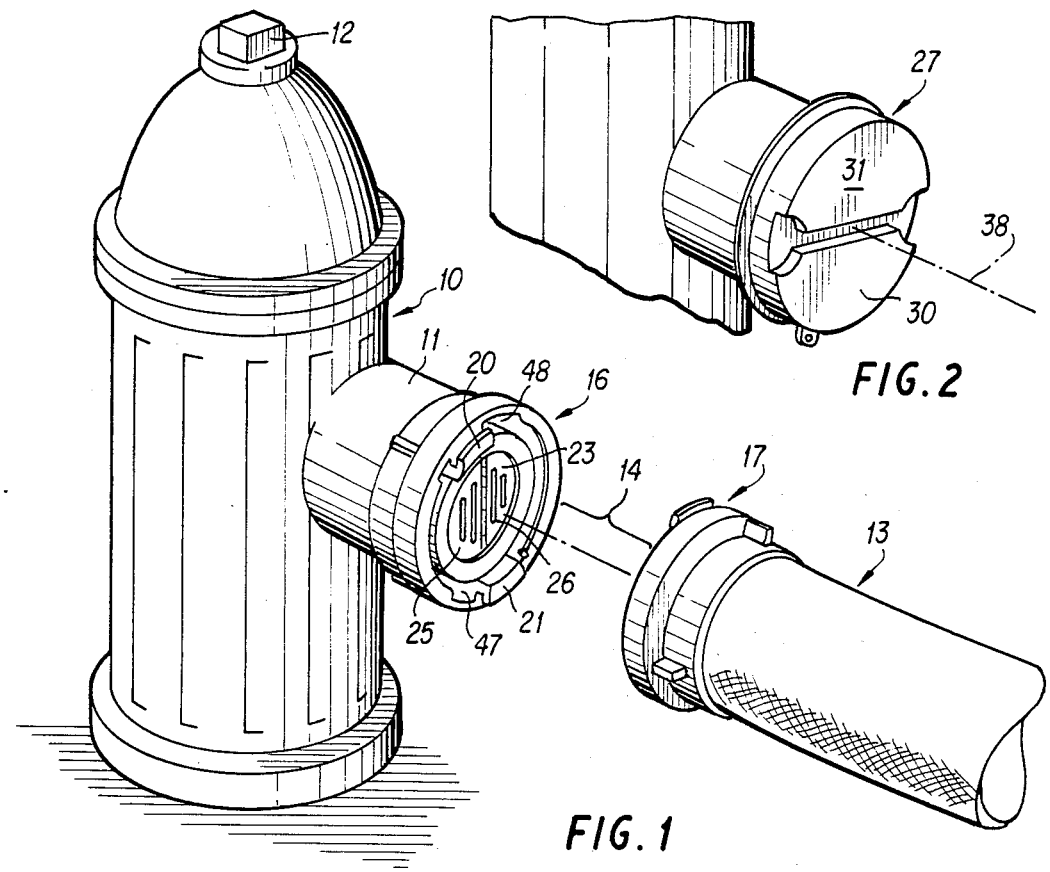
FIG. 2
FIG. 1
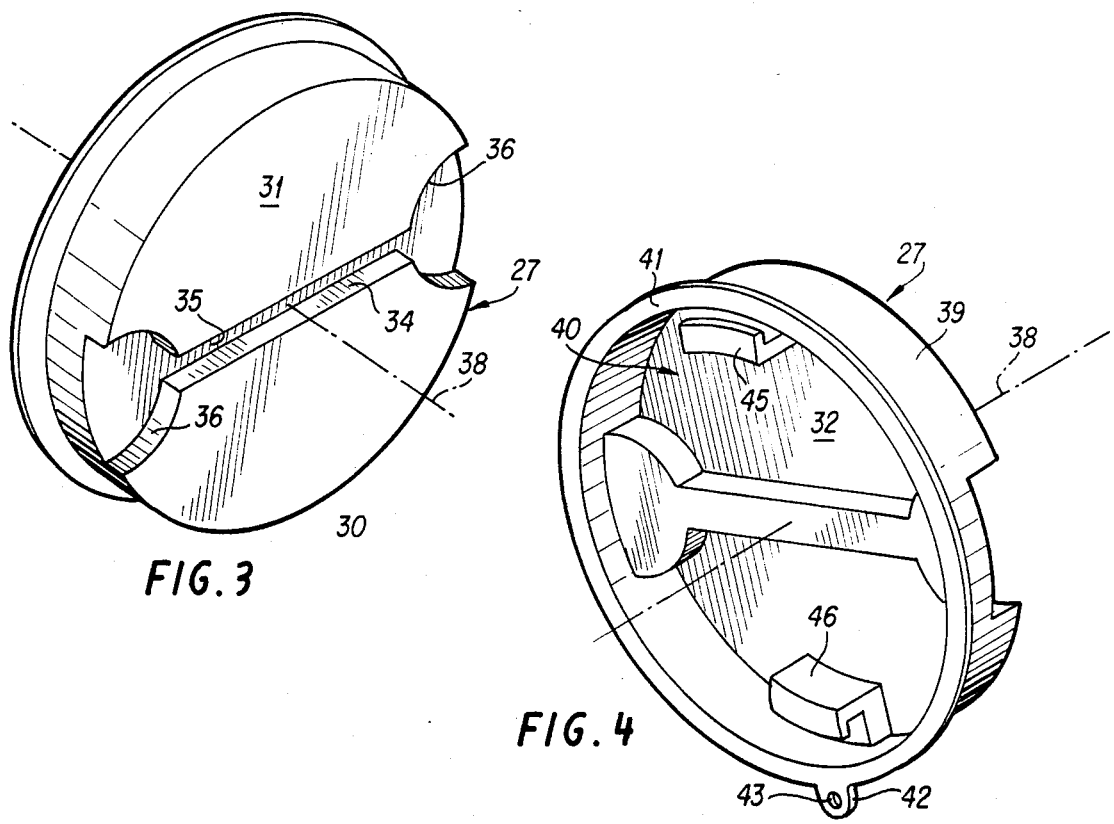
FIG. 3
FIG. 4

COUPLING FOR FIRE HYDRANT-FIRE HOSE CONNECTION

BACKGROUND OF THE INVENTION

1. Field of the Invention

The instant invention relates to couplings for a fire hydrant-fire hose connection. More particularly, the instant invention relates to such couplings wherein connections may be made swiftly and accurately when necessary, but wherein the fire hydrant is protected when not in use.

2. Description of the Prior Art

Generally, fire hoses from a fire truck are connected to a fire hydrant by a unfastening a cap from the mouth of the fire hydrant and fastening the fire hose thereto, or if a cap or cover is not positioned on the fire hydrant, merely fastening the end of the hose to the hydrant. Thereafter, the hose is tightly secured to the fire hydrant so as to withstand the high water pressure flowing through the connection between the fire hydrant and fire hose.

It is important that the connection between the fire hose and fire hydrant be made quickly and efficiently in that the amount of water which can be directed on a fire during the first two to five minutes after fire-fighting equipment reaches the scene of a fire is major factor with respect to how quickly the fire can be brought under control. Quick response helps limit fire damage even before the fire is extinguished. With most prior art methods of connecting fire hoses to a fire hydrant, the first two to five minutes after such equipment arrives at the scene of the fire are spent attempting to connect the hose with the hydrant which results in delays that frequently result in several thousand dollars of additional fire damage.

In an attempt to minimize the delay, many fire companies use a quick-coupling apparatus such as that set forth in U.S. Pat. No. 3,638,907, wherein a female member attached to the hose is thrust over a male member on the neck of the fire hydrant and quickly clamped in place. While this apparatus is effective and saves considerable time, it is heavy and relatively expensive.

Many fire companies are now utilizing their fire engines another type of coupling known as the "Storz connector," which is a rotating coupling utilizing lugs that interlock with grooves. However, in this country, virtually no fire hydrants are equipped with couplings to receive the Storz couplings mounted on fire engines. Consequently, fire engines must carry a mating coupling for attachment to fire hydrants once the trucks arrive at the hydrants. The firemen must then remove the existing cap over the mouth of the fire hydrant and screw on a Storz connector. This, of course, consumes considerable time and defeats the purpose of utilizing a quick connection type of coupling. Moreover, the Storz couplings currently available do not have any means for sealing the fire hydrant mouth. Consequently, the couplings cannot be left on hydrants after use.

SUMMARY OF THE INVENTION

In view of the foregoing considerations, there is a need for a new and improved coupling which allows Storz-type connectors to be readily usable as fire hydrant-fire hose couplings, while retaining the quick connection features thereof and not compromising the safety and security of the fire hydrant when the hydrant is not in use (which is, of course, almost all the time).

Upon further study of the specification and appended claims, further objects and advantages of this invention will become apparent to those skilled in the art.

In view of the foregoing object and other objects, the instant invention contemplates a fire hydrant-fire hose coupling having first and second coupling members, wherein the first and second coupling members are identical in configuration with one member being permanently attached to a fire hose and the other coupling member being retrofitted to a fire hydrant for permanent installation. The couplings each include projecting lugs and recessed grooves complementing the projecting lugs and recessed grooves of the other coupling. In order to protect the fire hydrant when not in use, the coupling, which is retrofitted thereto, includes a valve therein which is normally closed and which opens upon applying pressure thereto from within the fire hydrant. In order to further protect the retrofitted coupling when not in use, a protective cap is provided which has coupling means thereon that complement the coupling means of the retrofitted coupling member.

BRIEF DESCRIPTION OF THE DRAWINGS

FIG. 1 is an exploded view, in perspective, showing a fire hydrant equipped with one half of a coupling in accordance with the present invention, aligned for connection with a fire hose having a coupling which is complementary to the coupling attached to the fire hydrant;

FIG. 2 is a perspective view showing a protective cap fitted over the coupling on the fire hydrant;

FIG. 3 is a perspective view of the outside of the cap shown in FIG. 2;

FIG. 4 is a perspective view of the inside of the cap shown in FIG. 2;

DESCRIPTION OF THE PREFERRED EMBODIMENT

Figure 5:
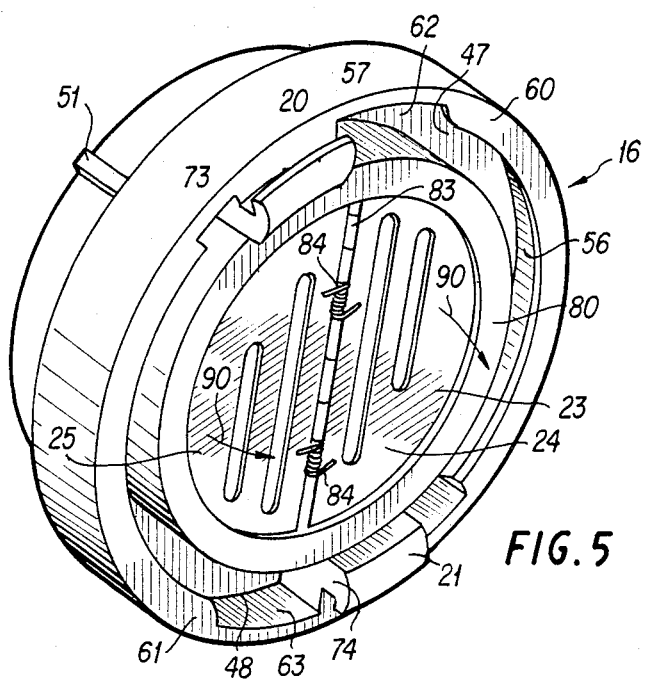
FIG. 5 is a perspective view of the coupling shown in FIG. 1.

Referring now to FIG. 1, there is shown a fire hydrant, designated generally by the numeral 10, which has a laterally extending neck portion 11 having a mouth therein (not shown) which communicates with the interior of the fire hydrant and provides an outlet for water from the hydrant. Typically, in operation, the fire hydrant 10 has a valve therein which is opened by turning an operating nut 12. Pressurized water then flows into the hydrant 10, through the neck 11 and out of the mouth.

Typically, a hose, designated generally by the numeral 13, is dismounted from a fire truck, or perhaps a fire station, and is coupled to the neck 11 of the fire hydrant 10. In accordance with the principals of the instant invention, this coupling is effected by a "Storz connector," designated generally by the numeral 14. The Storz connector 14 is "sexless" and has first and second coupling members, designated generally by the numerals 16 and 17, respectively. The coupling member 16 is attached to the neck 11 of the hydrant 10 while the second coupling member 17 is connected to the hose 13. Generally, the coupling member 16 is retrofitted on the neck 11 and is a permanent installation. The second coupling on the hose 13 is permanently mounted thereon and usually provided with the hose 13 when the hose is purchased.

As is seen in FIG. 1, the first coupling member 16 has a pair of locking lugs 20 and 21 projecting therefrom. As will be further explained hereinafter, the locking lugs 20 and 21 cooperate with grooves in the second coupling member 17. Moreover, in order to protect the interior of the hydrant 10 from vandalism, the coupling member 16 is provided with a butterfly valve, designated generally by the numeral 23. As will be further explained hereinafter, the butterfly valve has two flaps 25 and 26 which are biased shut toward the interior of the fire hydrant 10. When the hydrant 10 is pressurized by opening the valve therein upon rotating the operating nut 12, water pressure within the hydrant forces the flaps 25 and 26 to open against their bias and allow water within the hydrant 10 to flow from the neck 11 into an attached hose 13. In addition to protecting the interior of the hydrant, it is desirable to protect the lug 20 and 21 and groove 47 and 48 area of the coupling member 16 from severe climatic conditions such as snow or ice build-up or sand, dust and grit. As is seen in FIG. 2, a protective cap, designated generally by the numeral 27, is provided to fit over the first coupling member 16.

As is seen in FIGS. 3 and 4 in combination with FIG. 2, the protective cap 27 has a generally planar end portion 30, which has an outer surface 31 and an inner surface 32. Disposed in the end portion 30 is a "dumbell"13 shaped slot 34 which has a straight elongated portion 35 which opens to a pair of relatively wide thumb holes 36. In order to engage or to remove the cap 27, thumbs or fingers can be placed in the thumb holes 36 so as to rotate the cap 27 about its axis 38. Alternately, a tool with a handle and elongated shaft or blade (not shown) can be inserted into the slot 34 so as to rotate the cap 27 about its axis 38. As an added feature, the protective cap 27 may be permanently color coded to aid fire departments in identifying flow rates, location, or other important information regarding the fire hydrant. A cylindrical wall 39 depends from the end portion 31 and cooperates therewith to provide an enclosure, designated generally by the numeral 40, which fits over the first coupling member 16. Depending from the side wall 39, there is a radially projecting rim 41. The radially projecting rim 41 has a lug 42 depending therefrom with a hole 43 therethrough, which hole can receive a chain for attaching the cover 27 to the fire hydrant 10 after it is removed from the neck 11 so that a hose 13 can be attached thereto. In the confusion of a fire, it is quite easy to misplace a cap 27, consequently some means for attaching the cap to the hydrant is needed.

As is seen in FIG. 4, the cap 27 has a pair of opposed lugs 45 and 46 which are received in grooves 47 and 48 (see FIGS. 1, 5 and 6) in the first coupling 16 and which function to hold the cap 27 in place upon twisting the cap. The lugs 20 and 21 on the first coupling member 16 are simply received within the enclosure 40 and need not grip any portion of the cap 27 since a tight, leak-proof connection between the first coupling member 16 and the cap is not needed.

Figure 6:
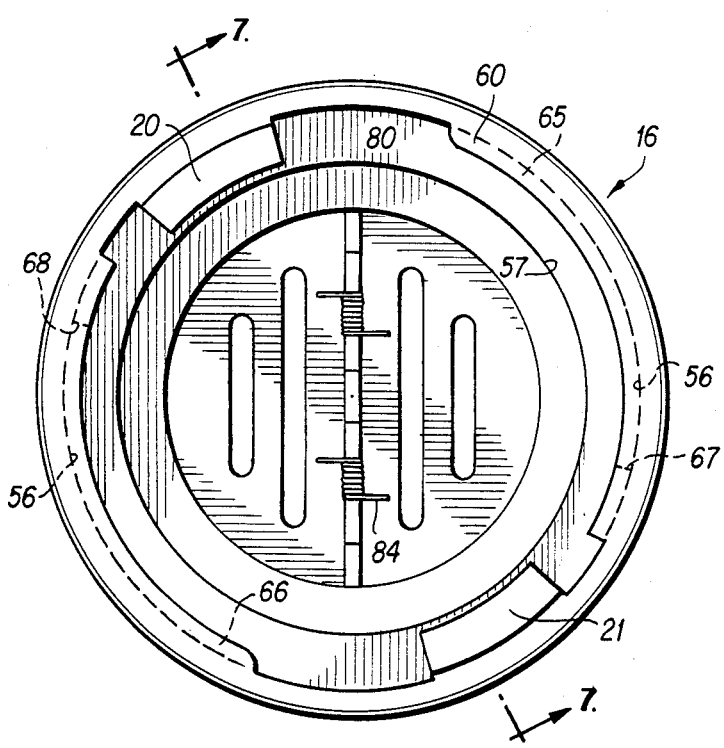
FIG. 6 is an end planar view of the coupling shown in FIGS. 1 and 5.
Figure 7:
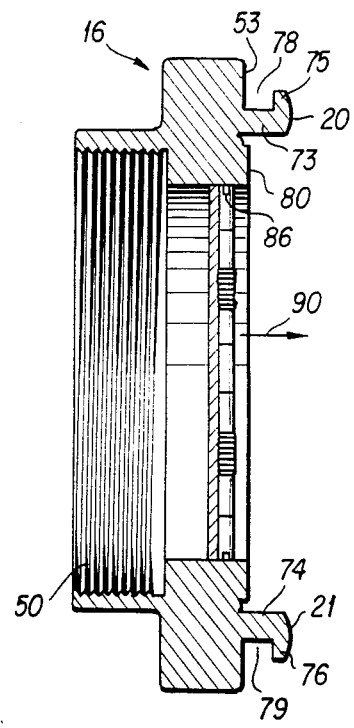
FIG. 7 is an elevation of the coupling shown in FIGS. 1, 5, and 6, taken along line 7—7 of FIG. 6.

Referring now more specifically to FIGS. 5, 6 and 7, wherein the first coupling member 16 is shown, it is seen that the first coupling member has an internally threaded collar 50 which is screwed onto the neck 11 of the fire hydrant 10. Almost all fire hydrants 10 have a standard threaded portion on the neck 11 thereof, adjacent the outlet opening. Consequently, the first coupling member 16 can be conveniently retrofitted on numerous fire hydrants. In order to mount the first coupling member 16 semipermanently on the neck portion 11, the internally threaded collars 50 have externally projecting radial lugs 51, which may be readily gripped with a large wrench or hit with a hammer in order to tighten the first coupling member onto the neck.

Just in front of the internally threaded collar 50 there is one-half of a Storz-type coupling, wherein a pair of opposed lugs 20 and 21 project from a substantially planar end portion 53 of the first coupling member 16. Adjacent and disposed clockwise to the lugs 20 and 21 are the substantially identical grooves 47 and 48. The substantially identical grooves 47 and 48 are formed in the first coupling member 16 between an outer wall 56 and inner wall 57. Overlying the slots 47 and 48 are lips 60 and 61 which are spaced from the lugs 20 and 21 by a distance equal to the circumferential length of the lugs to form inlet openings 62 and 63, respectively. The lips 60 and 61 have internal ramp surfaces 65 and 66 which are inclined in the clockwise direction so that the thickness of the flanges 60 and 61 increases from the recesses 62 and 63 in the clockwise direction with respect to FIG. 5. At the clockwise end of the lips 60 and 61 there are abutments 67 and 68, respectively.

As is best seen in FIG. 7, the lugs 21 and 22 have strut portions 73 and 74, which extend all the way to the bottom of the grooves 47 and 48 and axially beyond the surface 53, which surface includes the outer surfaces of the lips 60 and 61. Projecting radially outwardly from the struts 73 and 74 are lug lips 75 and 76, respectively, which define slots 78 and 79, respectively.

As was stated before, the Storz couplings 16 and 17 are sexless, or in other words identical, with second coupling member 17 having lugs 20 and 21 identical to those of the first coupling member 16 and grooves 47 and 48, also identically configured. Upon bringing the first and second coupling members 16 and 17 of the Storz coupling 14 together, the lugs 20 and 21 of one coupling are received in the recesses 62 and 63 of the other coupling. The second coupling member 17, which is rotatably mounted on the hose 13 in a convention manner, is then rotated in the clockwise direction with respect to the first coupling member 16, as shown in these drawings. The outer surfaces of the lips 76 engage the ramps 60 and 61 so as to be cammed toward the bottom of the slots 47 and 48 as the second coupling number 17 rotates. As the second coupling member 17 rotates, the first and second coupling members are drawn together in the axial direction, abutting the surfaces 60 and 61 on each of the coupling members. Typically, each of the coupling members 16 and 17 would have an annular rubber gasket therein. However, coupling member 16, being semipermanently attached to the fire hydrant and subject to a variety of environmental conditions and repeated wear, would necessitate high maintenance in the form of continued gasket replacement. Consequently, the invention would incorporate a solid machined surface 80 to mate with a rubber gasket positioned in an identical location within coupling member 17. The machined surface 80 of coupling member 16 is positioned so as to initially extend slightly above the outer planar surface 53, defined by the outer surfaces of lips 60 and 61. Consequently as the first and second coupling members 16 and 17 are drawn together, the gasket and machined surface 80 are pressed into abutment and form a water-tight seal between the coupling members.

The butterfly valve 23 consists of flaps 24 and 25, pivoted on a shank 83 or normally biased by coil springs 84 to the closed position against an internal rim 86. The butterfly valve 23 prevents access to the interior of the fire hydrant 10, but opens to allow water under pressure within the hydrant 10 to flow therethrough. In other words, the flaps 24 and 25 of the butterfly valve 23 open outwardly with respect to FIGS. 1, 5 and 6 in the direction of arros 90 when the hydrant 10 is pressurized with water.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In combination, a fire hydrant, a hose for connection to the fire hydrant, a connector having a fire coupling member mounted on the first hydrant and a second coupling member mounted on the hose, wherein the improvement comprises:
    means on the first coupling member for retrofitting the coupling member to the fire hydrant;
    a pair of identical projecting lugs and identical slot means on each of the coupling members, the slot means on one of the coupling members receiving the lugs of the other coupling member so as to couple the identical coupling members with a "sexless" connection;
    a butterfly valve within the first coupling member wherein said butterfly valve includes a pair of flaps biased closed by a spring means when there is no internal water pressure in the fire hydrant, thereby preventing access to the fire hydrant; and
    a cover member for fitting over the first coupling member while the hydrant is not in use, the cover member being a single piece and including a face portion for covering the opening through the first coupling, the cover member including a wall portion enclosing an internal area which approximates in configuration the area of the first coupling member, the cover member having lug means projecting therein, which lug means cooperates with the slot means of the first coupling member to lock the cover member of the first coupling member upon rotating the cover member with respect thereto, the cover member further including a linear slot in the face portion thereof, the slot having a closed bottom surface, the slot extending completely across the cover and opening radially thereof with widened portions at the ends thereof for forming finger grips in the face portion of the cover member.

* * * * *